(No Model.) 3 Sheets—Sheet 1.
W. J. PERKINS.
SAW GRINDING-MACHINE.
No. 411,729. Patented Sept. 24, 1889.
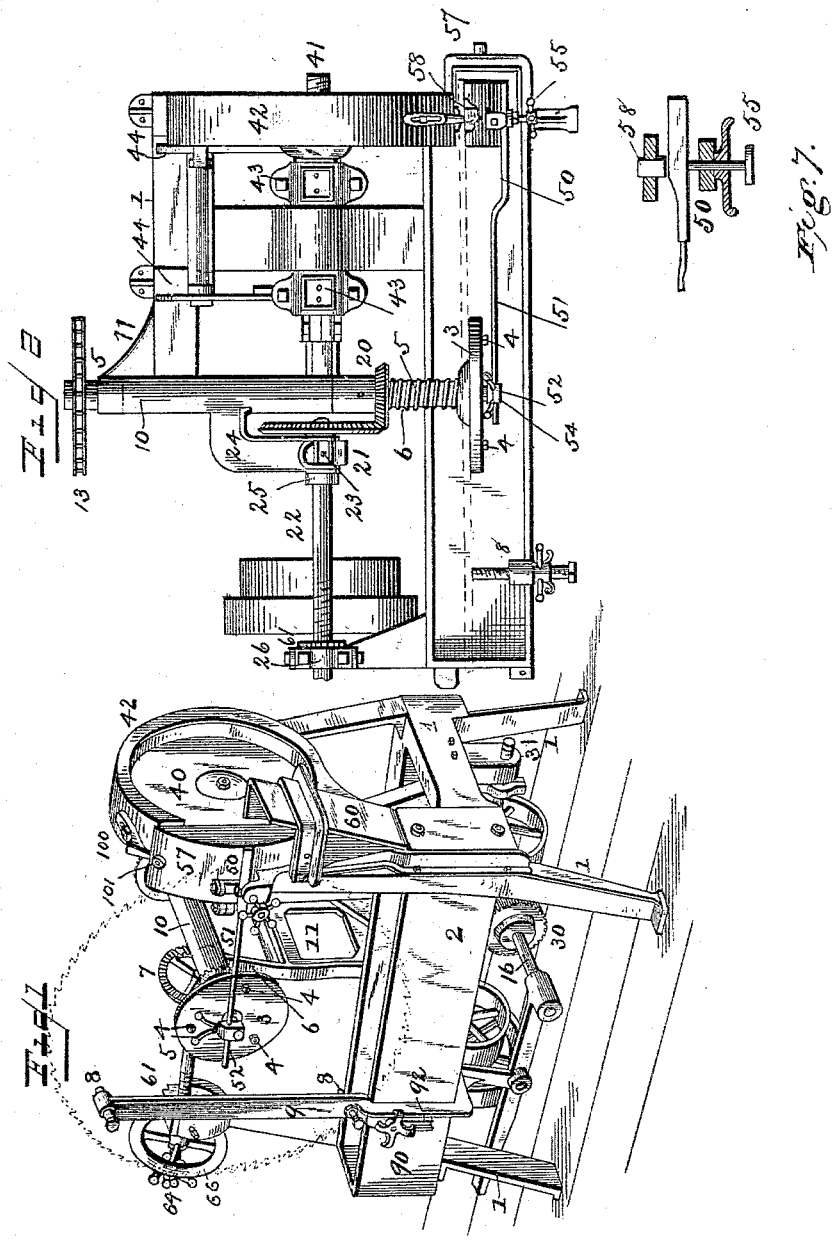
WITNESSES
F L Ourand
C. M. Bartlett
INVENTOR
Willis J. Perkins
By Wallace A. Bartlett
Attorney (No Model.) 3 Sheets—Sheet 2.

W. J. PERKINS.
SAW GRINDING MACHINE.

No. 411,729. Patented Sept. 24, 1889.

WITNESSES
F. L. Ourand
L. M. Bartlett

INVENTOR
Willis J. Perkins
By Wallace A. Bartlett
Attorney (No Model.) 3 Sheets—Sheet 3.
W. J. PERKINS.
SAW GRINDING MACHINE.
No. 411,729. Patented Sept. 24, 1889.
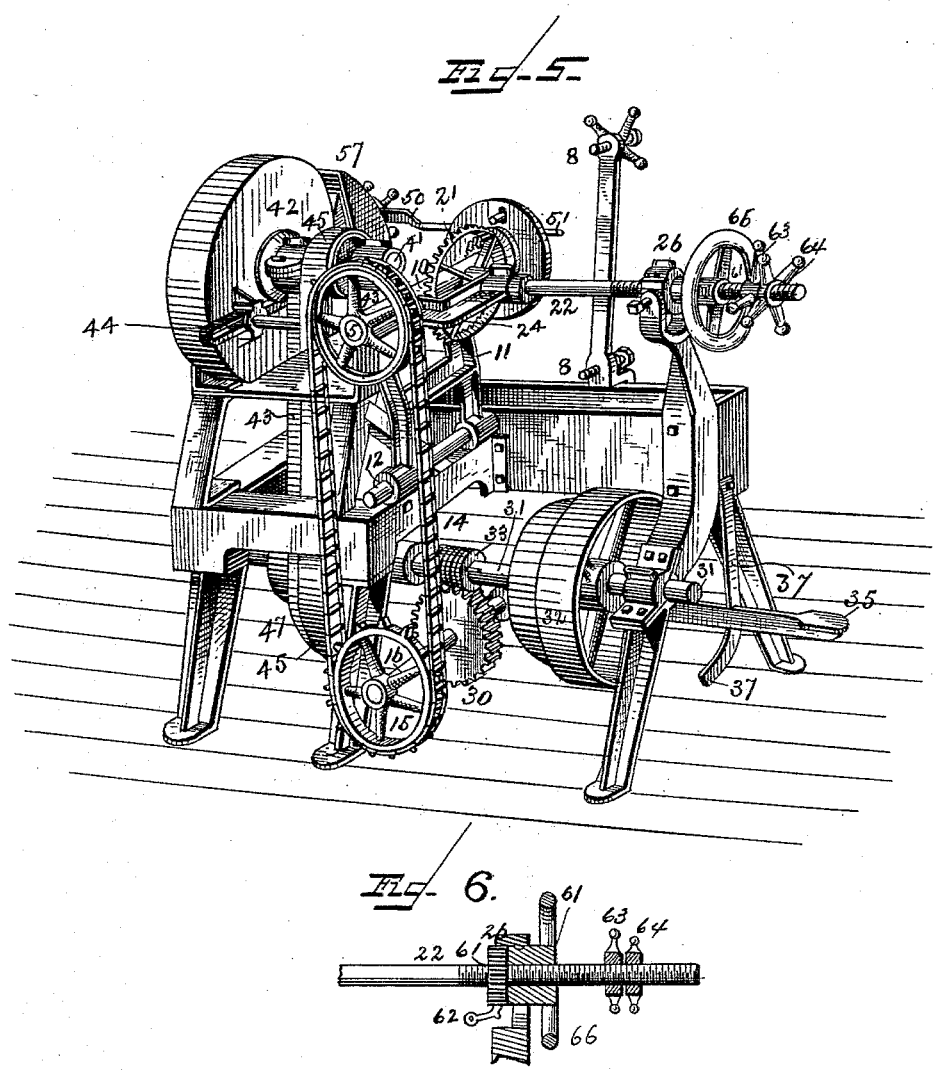
WITNESSES
F. L. Ourand.
L. M. Bartlett.
INVENTOR
Willis J. Perkins
By Wallace A. Bartlett
Attorney

UNITED STATES PATENT OFFICE.

WILLIS J. PERKINS, OF GRAND RAPIDS, MICHIGAN.

SAW-GRINDING MACHINE.

SPECIFICATION forming part of Letters Patent No. 411,729, dated September 24, 1889.

Application filed February 27, 1888. Serial No. 265,376. (No model.)

*To all whom it may concern:*

Be it known that I, WILLIS J. PERKINS, residing at Grand Rapids, in the county of Kent and State of Michigan, have invented certain new and useful Improvements in Saw-Grinding Machines, of which the following is a specification, reference being had therein to the accompanying drawings.

This invention relates to saw-grinding machines for circular saws.

The object of the invention is to produce an improved machine for use in saw-mills, by which circular saws may be ground to a uniform thickness and taper, and the thickness reduced as the saw wears away or maintained at a standard gage.

Circular saws such as are used in sawing shingles are made thickest at the central portion, where the faces are parallel, and diminish in thickness from the flange to the edge. As the teeth are worn away in filing, the saw gradually becomes reduced in diameter and increased in thickness. The increased thickness is detrimental because a thick saw uses up more of the timber by making a wider kerf, and consequently fewer shingles can be sawed from a block of given size, and more power is required to drive the saw.

In the present invention the salient idea is that the machine automatically grinds a sawblade to any predetermined gage and thickness when once the gage has been determined, and any number of saws differing in thickness of body can be ground so as to have the same edge thickness, and consequently cut with a like kerf. This is very important where a plurality of saws are employed in a shingle-sawing machine, especially a rotary machine.

Figure 3:
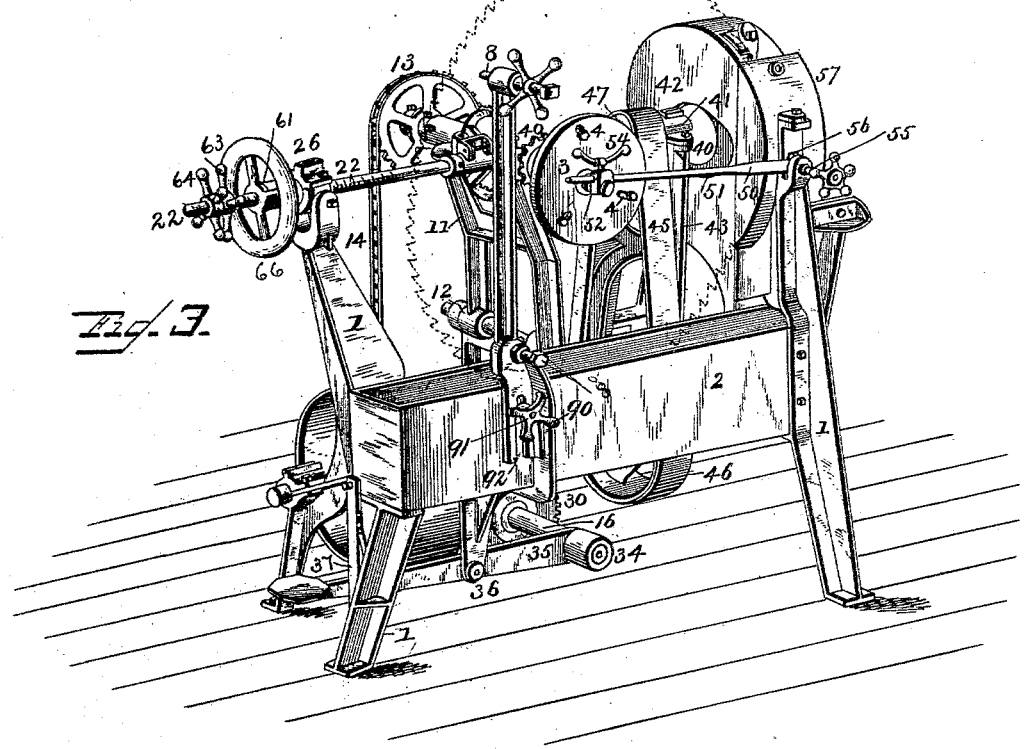
Figure 4:
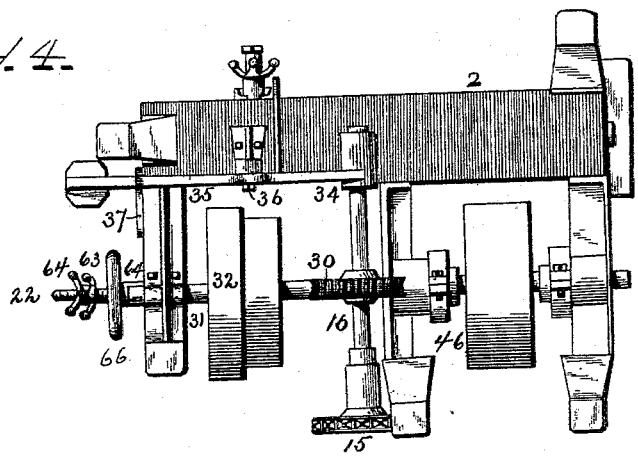

In the drawings, Figure 1 is a perspective view of the saw-grinding machine from the right and front, the position of the saw being shown in dotted lines only. Fig. 2 is a plan of the machine, parts being broken away and the driving-gear not shown. Fig. 3 is a perspective view from the left and front of the machine, the saw being indicated in dotted lines. Fig. 4 is a bottom view, showing more particularly the driving-gear. Fig. 5 is a rear perspective of the machine. Fig. 6 is a detail of feed-screw. Fig. 7 is a section through the saw-gage and block which bears on the saw.

In the drawings, 1 indicates the frame of the machine.

2 denotes a trough at the front of the machine, in which the lower edge of the saw runs while grinding.

The flange of the saw is secured to a faceplate 3 by screws 4 4 4, which enter the holes in the saw or flange by which it is secured to the arbor. Face-plate 3 is attached to a shaft 5, and is pressed forward by a spring 6, surrounding said shaft. This presses the saw against rests or supports 8 8 on the standard 9 and adjustable support 50 opposite grinding-wheel. Rests 8 8 are adjustable toward the face of the saw, and serve to make the saw turn without wabbling on its bearings, and hold it away from grinding-wheel. The standard 9 is vertically adjustable, being secured by set-nut 90 on bolt 91 passing through slot 92 in the standard. The bolt 91 is attached to trough 2, allowing standard 9 to be readily removed to place same. The shaft 5 is journaled in a long box or bearing 10 or a number of boxes supported on pivoted support 11, which is hinged or pivoted to the main frame by pivotal shaft or pin 12. (See Fig. 5.) The shaft 5 is driven by a sprocketpulley 13, keyed or otherwise fixed thereto, and this pulley 13 receives its motion by means of a sprocket chain or belt 14, passing round a sprocket-pulley 15 on cross-shaft 16. A bevelgear 20 on shaft 5 and rotating therewith engages a bevel-gear 21 on screw-shaft 22. The shaft 22 has a bearing at 23 in arm 24, attached to the sleeve 10. The screw-shaft 22 bears a collar 25, which presses against the arm 24. The screw-shaft 22 passes through the nut at 26, which serves to feed the shaft lengthwise as it is rotated by means of the bevel-gears referred to, and the swinging frame 11 is thus swung on its hinge, carrying the shaft 5 and the saw mounted thereon toward or away from the emery-wheel, (to be described,) according to the direction of rotation. This train of mechanism constitutes the automatic feeding device, as it carries the saw bodily toward or away from the grinding-wheel.

The shaft 16 bears a worm-wheel 30, which can be thrown into engagement with a worm 33 on main shaft 31. One end of shaft 16 is journaled in a bearing 34 on trip-lever 35, which lever is pivoted to the frame at 36, and may be held to lift the shaft and throw the worm-gear into engagement by means of catch 37. (See Figs. 3 and 4.) When the worm-gear is in engagement, the saw will be slowly rotated by means of the sprockets and chain-driving mechanism and will be swung on the pivoted frame 11 by means of screw-shaft 22.

An emery-wheel 40 is carried by arbor 41 and runs inside of casing 42. Arbor 41 is borne in bearings on top of swinging frame 43, which is supported concentric with the main shaft 31. The position of the top of frame 43 is adjusted by a clamp or clamps 44, held by a screw or otherwise, so that the arbor 41 may be thrown more or less toward the saw and fastened by said clamp. The casing 42 is slotted to permit this adjustment, and adjustment is made as often as rendered necessary by the wearing away of the emery-wheel. The arbor 41 is driven by a belt 45 from a pulley or cone 46 on shaft 31, running round pulley 47 on said arbor, so that the arbor will be driven steadily whatever its position.

The emery-wheel wears away very rapidly, and some arrangement for adjusting it toward the saw-plate is very desirable. Back of the saw, opposite the emery-wheel, there is a gage 50, of wedge shape or tapering, and attached to a rod 51. This rod 51 passes through a socket 52, attached to face-plate 3, and may be held by a nut 54 to any desired position in said socket. This will hold the wedge portion 50 of the gage in any desired position in front of the bearing-screw 55. The bearing screw or piece 55 presses against gage 50, and so holds forward a saw-rest 58 inside of the casing-section 57. The gage 50 moves lengthwise with the movement of frame 11, so that the distance between the edge of the emery or grinding wheel and the edge of this gage 50 changes with the movement and form of said gage. The gage thus regulates the thickness of saw-plate, as the thickness of the plate, its rests, and the gage 50 will at all times equal the distance from the end of the screw 55 to the edge of the grinding-wheel. Gage 58 is formed straight where screw 55 bears, and of any suitable shape on opposite face, against which rest 58 bears, the usual form being as shown in detail, Fig. 7.

The screw 55 can be adjusted within its limits, and must afford a firm bearing to the rear edge of the gage. The frame is made strong enough to secure this firmness of bearing. The taper or bevel of the saw will be determined by gage 50, and this gage will be made according to the ideas of the sawyer.

The bottom of the saw will be all the time in the water in trough 2. A spout 60 is applied to carry the water down into the trough which may be raised by rotation of the saw.

100 and 101 are connections for attaching water-pipes to spread a stream of water on either side of the saw.

The nut at 26 is a ratchet-nut 61, and is held from rotation by a pawl 62. A lock-nut 63 64 on the shaft 22 may be adjusted to any desirable position thereon. When, by the forward movement of this lock-nut, the face of said nut comes in contact with the rear face of the ratchet-nut, the pawl 62 will be thrown out of engagement by the increased strain, and the nut 61 will then be free to rotate in its bearings 26, and the shaft 22 will not be fed farther forward, as the nut and shaft will turn together. To swing the frame 11 back, the hand-wheel 66, attached to the ratchet-nut, is rotated, (the pawl being out of engagement,) and the rotation of this nut in its bearings 26 withdraws shaft 22 and swings the saw back.

A spout leads from the immediate vicinity of the grinding-wheel to the trough, to convey back any water that may be brought up by the saw and also the abraded particles from the saw and grinding-wheel.

It will be understood that the substitution of equivalent mechanism is contemplated in my machine, and that I desire to claim the mechanism illustrated or the mechanical equivalent thereof.

What I claim is—

1. In a saw-grinding machine, the combination of a movable saw-support, a tapering gage connected to and movable with the support and bearing directly on one face of the saw, and a grinding-wheel bearing on the face of the saw directly opposite the gage, substantially as described.

2. In a saw-grinding machine, a rotating grinder, a pivoted frame, a rotating shaft mounted on said frame at the end opposite the pivot, a saw-clamp on said shaft, and a shifter for swinging the frame toward and away from the grinder, substantially as stated.

3. In a saw-grinding machine, a rotating shaft and a spring-head thereon to which a saw may be affixed, a gage connected to said shaft, and a grinding-wheel in proximity to one face of the gage, substantially as described.

4. In a saw-grinding machine, the combination of a rotating shaft mounted in a swinging frame, a gage connected to said shaft so as to move with the swinging frame, and a grinding-wheel in proximity to the gage, all in combination, as set forth.

5. In a saw-grinding machine, the combination of a grinding-wheel, a gage or rest in proximity to the wheel, a rotating saw-carrying shaft and a shifter therefor, and a water-trough in which the lower part of the saw runs when shifted nearer to or farther from the grinding-wheel.

6. The combination, with a rotating saw-carrying shaft and a shifter therefor, of a plurality of rests at different elevations, against which rests one face of the saw bears, and a grinding-wheel operating against the other face of the saw, as set forth.

7. In a saw-grinder, a rotating saw-carrying shaft, a swinging frame on which said shaft is mounted, a screw-shaft connected with the frame, and a train of gears connected with the saw-carrying shaft and with the screw-shaft by which the swinging frame may be actuated as the saw is rotated, substantially as described.

8. The combination, in a saw-grinding machine, of a movable support bearing the saw, a gage having the face contour desired for the saw bearing directly on one face thereof, and a grinding-wheel bearing on the opposite face of the saw, whereby the gage determines the bevel of the saw, as set forth.

9. The combination, with a movable saw-support, of a beveled gage connected to said support in position to bear directly against one face of the saw, an adjustable bearing-piece serving as a support for said gage, and a grinding-wheel in position to operate on the face of the saw opposite the gage, substantially as described.

10. In a saw-grinding machine, the combination of a rotating grinding-wheel, a rotating saw-shaft, a trough in which the bottom of the saw runs, and a spout leading from the vicinity of the grinding-wheel to the trough, as set forth.

11. In a saw-grinder, the combination, with the rotating saw-carrying shaft and spring having a bearing-pressure against the saw, of the plurality of rests or bearings for the saw on the opposite side of the saw from the spring, as set forth.

12. The combination of the rotating saw-carrying shaft and a shifter therefor and a series of rests against which one face of the saw bears, an arm holding one of said rests, and a bolt holding said arm to the machine, substantially as described.

In testimony whereof I affix my signature in presence of two witnesses.

WILLIS J. PERKINS.

Witnesses:
EDWARD TAGGART,
ARTHUR C. DENISON.